US009232391B2

(12) United States Patent
Wang et al.

(10) Patent No.: US 9,232,391 B2
(45) Date of Patent: Jan. 5, 2016

(54) AUTHENTICATION SYSTEM FOR DEVICE-TO-DEVICE COMMUNICATION AND AUTHENTICATION METHOD THEREFOR

(71) Applicant: Industrial Technology Research Institute, Hsinchu (TW)

(72) Inventors: Jui-Tang Wang, Keelung (TW); Tzu-Ming Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 157 days.

(21) Appl. No.: 13/888,380

(22) Filed: May 7, 2013

(65) Prior Publication Data

US 2013/0315393 A1   Nov. 28, 2013

Related U.S. Application Data

(60) Provisional application No. 61/643,383, filed on May 7, 2012.

(30) Foreign Application Priority Data

May 6, 2013  (TW) .............................. 102116114 A

(51) Int. Cl.
*H04W 12/04* (2009.01)
*H04W 12/06* (2009.01)
*H04W 76/02* (2009.01)

(52) U.S. Cl.
CPC .............. *H04W 12/04* (2013.01); *H04W 12/06* (2013.01); *H04W 76/023* (2013.01)

(58) Field of Classification Search
None
See application file for complete search history.

(56) References Cited

U.S. PATENT DOCUMENTS 7,596,690 B2  9/2009  Singh
7,974,234 B2  7/2011  Gustave et al.
(Continued)

FOREIGN PATENT DOCUMENTS

EP       1650915      4/2006
WO    2010030515     3/2010

OTHER PUBLICATIONS

"3rd Generation Partnership Project; Technical Specification Group Services and System Aspects; 3G Security; Cryptographic algorithm requirements, (Release 11)" 3GPP, 3G TS 33.105, V11.0.0, Sep. 2012, pp. 1-24.
(Continued)

*Primary Examiner* — Hadi Armouche
*Assistant Examiner* — Malcolm Cribbs
(74) *Attorney, Agent, or Firm* — Jianq Chyun IP Office

(57) ABSTRACT

An authentication system for device-to-device (D2D) communication and an authentication method thereof are provided. The authentication system further includes first user equipment (UE) and an authentication server. The authentication server is located within a communication range of the first UE. When the first UE sends a connection request to the authentication server, the authentication server performs a routine authentication procedure on the first UE and provides key generation information to the first UE. The authentication server generates a server key according to the key generation information and a key derivation procedure. The first UE generates an equipment key according to the key generation information and the key derivation procedure to obtain authentication for D2D communication, such that the first user equipment and a second UE obtaining the authentication for D2D communication directly perform the D2D communication without performing the D2D communication through the authentication server.

38 Claims, 8 Drawing Sheets

(56) References Cited

U.S. PATENT DOCUMENTS

| | | | |
|---|---|---|---|
| 2010/0153727 | A1 | 6/2010 | Reznik et al. |
| 2010/0285774 | A1 | 11/2010 | Ginzboorg |
| 2011/0098043 | A1 | 4/2011 | Yu et al. |
| 2011/0182426 | A1* | 7/2011 | Roosta et al. ............ 380/255 |
| 2012/0015607 | A1 | 1/2012 | Koskela et al. |
| 2012/0129540 | A1 | 5/2012 | Hakola et al. |
| 2012/0179789 | A1 | 7/2012 | Griot et al. |
| 2012/0284785 | A1 | 11/2012 | Salkintzis et al. |
| 2012/0314866 | A1 | 12/2012 | Horneman et al. |

OTHER PUBLICATIONS

"3rd Generation Partnership Project; Digital cellular telecommunications system (Phase 2+); Security related network functions, (Release 2000)", 3GPP, TS 03.20, V9.0.0, Jan. 2001, pp. 1-96.

"IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 6: Medium Access Control (MAC) Security Enhancements", IEEE, Std 802.11i, Jul. 2004, pp. 1-190.

Joao Alfaiate, et al., "Bluetooth Security Analysis for Mobile Phones" IEEE, 2012 7th Iberian Conference on Information Systems and Technologies (CISTI), Jun. 2012, pp. 1-6.

Muxiang Zhang, et al., "Security Analysis and Enhancements of 3GPP Authentication and Key Agreement Protocol", IEEE, Transactions on Wireless Communications, vol. 4, No. 2, Mar. 2005, pp. 734-742.

Gaoxiang Chen, et al., "An identity authentication scheme in wireless peer-to-peer network", IEEE, 2010 12th IEEE International Conference on Communication Technology (ICCT), Piscataway, NJ, USA, Nov. 11, 2010, pp. 473-476.

"Search Report of Europe Counterpart Application", issued on Sep. 11, 2013, p. 1-p. 10.

* cited by examiner

AUTHENTICATION SYSTEM FOR DEVICE-TO-DEVICE COMMUNICATION AND AUTHENTICATION METHOD THEREFOR

CROSS-REFERENCE TO RELATED APPLICATION

This application claims the priority benefits of U.S. provisional application Ser. No. 61/643,383, filed on May 7, 2012 and Taiwan application serial No. 102116114, filed on May 6, 2013. The entirety of each of the above-mentioned patent applications is hereby incorporated by reference herein and made a part of this specification.

TECHNICAL FIELD

The disclosure relates to an authentication system for device-to-device communication and an authentication method thereof.

BACKGROUND

Along with widespread of mobile communication techniques, wireless communication techniques used in mobile devices are generally required to connect a base station (BS) or a wireless access point (AP) to implement communication between the mobile devices, i.e. the BS or wireless AP has to be used to implement communication between the mobile devices, for example, a general packet radio service (GPRS) technique, a code division multiple access (CDMA) technique, a WIFI (IEEE 802.11) communication technique, etc. When the mobile device is located at a place with a poor signal reception or a place with none BS or wireless AP around, the mobile device could not communicate with other mobile devices. For example, when most of the BSs could not be used due to natural disasters, the user's mobile device could not communicate with others. Therefore, a technique of implementing device-to-device communication without using the BS or the wireless AP is required to be developed, i.e. the so-called device-to-device (D2D) direct communication.

The D2D direct communication refers to that various electronic devices directly perform data transmission, control, data sharing, or make phone call, etc. with each other through a corresponding communication protocol (for example, a Bluetooth protocol, a WIFI direct protocol, etc.) without using the BS or the wireless AP to perform intermediary management. The direct communication could also be referred to as D2D communication, proximity-based system, direct communication, smart direct link, etc. Presently, a new generation standard wireless communication technique researched and developed in a third generation partnership project (3GPP), for example, a long term evolution (LTE) technique, and a LTE advanced technique, etc., also hopes to integrate the direct communication technique into the LTE technique.

SUMMARY

One of the embodiments is directed to an authentication system for device-to-device communication and an authentication method thereof, which implements an authentication mechanism for device-to-device communication, and the authentication mechanism is extendingly applied to a payment mechanism, communication security mechanism, etc. for device-to-device communication.

One of the embodiments provides an authentication system for device-to-device communication. The authentication system includes first user equipment and an authentication server. The authentication server is located within a communication range of the first user equipment. When the first user equipment sends a connection request to the authentication server, the authentication server performs a routine authentication procedure on the first user equipment and provides key generation information to the first user equipment. The authentication server generates a server key according to the key generation information and a key derivation procedure. The first user equipment generates an equipment key according to the key generation information and the key derivation procedure, so as to obtain device-to-device authentication, such that the first user equipment and second user equipment obtaining the device-to-device authentication are able to directly perform the device-to-device communication without performing the device-to-device communication through the authentication server.

One of the embodiments provides an authentication system for device-to-device communication. The authentication system includes first user equipment, second user equipment and an authentication server. The authentication server is located within communication ranges of the first user equipment and the second user equipment. When the first user equipment and the second user equipment respectively send a connection request for device-to-device communication to the authentication server, the authentication server performs routine authentication procedures on the first user equipment and the second user equipment, and respectively provides first key generation information and second key generation information to the first user equipment and the second user equipment. The authentication server generates a server key according to the first key generation information, the second key generation information and a key derivation procedure. The authentication server respectively transmits the server key to the first user equipment and the second user equipment, such that the first user equipment and the second user equipment obtain device-to-device authentication and perform the device-to-device communication without performing the device-to-device communication through the authentication server.

One of the embodiments provides an authentication method for device-to-device communication, which is adapted to first user equipment in a communication system. The communication system further includes an authentication server and second user equipment. The authentication method includes following steps. A connection request is sent to the authentication server. The authentication server performs a routine authentication procedure on the first user equipment and provides key generation information, and the authentication server generates a server key according to the key generation information and a key derivation procedure. An equipment key is generated according to the key generation information and the key derivation procedure, so as to obtain device-to-device authentication, such that the first user equipment and the second user equipment obtaining the device-to-device authentication are able to directly perform the device-to-device communication without performing the device-to-device communication through the authentication server.

One of the embodiments provides an authentication method for device-to-device communication, which is adapted to an authentication server in a communication system. The communication system further includes first user equipment and second user equipment. The authentication method includes following steps. A connection request sent from the first user equipment is received. A routine authentication procedure is performed on the first user equipment and key generation information is provided to the first user equipment. A server key is generated according to the key generation information and a key derivation procedure. The first user equipment generates an equipment key according to the key generation information and the key derivation procedure, so as to obtain device-to-device authentication, such that the first user equipment and second user equipment obtaining the device-to-device authentication are able to directly perform the device-to-device communication without performing the device-to-device communication through the authentication server.

According to the above descriptions, the authentication system and the authentication method of the disclosure implement the authentication mechanism for device-to-device communication. The user equipment first implements the device-to-device authentication through the authentication server and obtains a corresponding authentication key, and after implementing the device-to-device authentication, the user equipment is able to directly communicate with the other authenticated user equipment without performing the communication through a communication processing device (for example, a base station or a wireless access point). The authenticated user equipment of the disclosure could implement device-to-device mutual authentication, device-to-device communication mechanism, key distribution and key updating with other user equipment according to key valid information set in the authentication key, and a charging mechanism and security mechanism could be added to a determination mechanism of the device-to-device authentication, so as to protect the interests of manufacturers implementing the device-to-device communication system and interests of users using the device-to-device communication system.

Several exemplary embodiments accompanied with figures are described in detail below to further the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

The authentication system and the authentication method of the disclosure implement an authentication mechanism for device-to-device (D2D) communication, where a user equipment first implements authentication for the D2D communication through an authentication server and obtains a corresponding authentication key, and after implementing the authentication for the D2D communication, the UE is able to directly communicate with the other authenticated user equipment without performing the communication through a communication processing device (for example, a base station (BS) or a wireless access point (AP)). Moreover, a charging mechanism could be added to the authentication procedure to achieve a model of user-pay.

Figure 1:
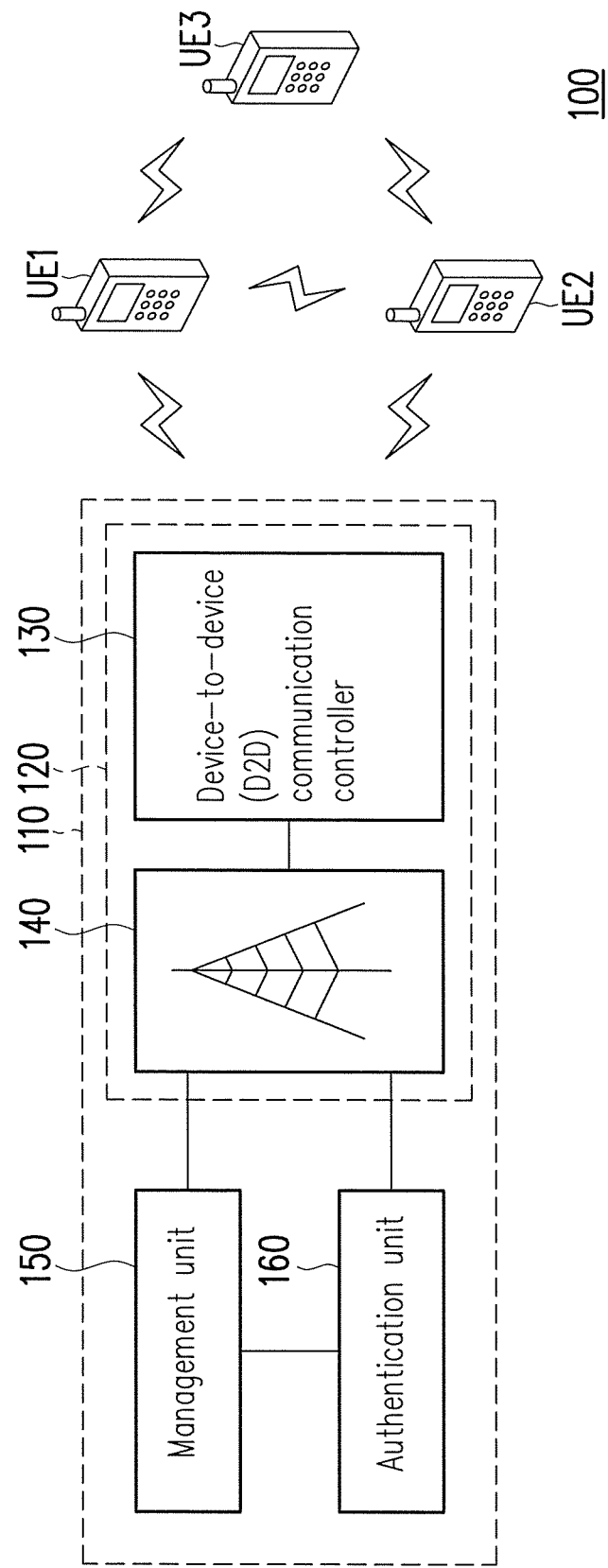
FIG. 1 is a block diagram of an authentication system for device-to-device (D2D) communication according to an embodiment of the disclosure.

FIG. 1 is a block diagram of an authentication system for D2D communication according to an embodiment of the disclosure. The authentication system 100 of the disclosure is complied with a wireless communication network protocol provided by a third generation partnership project (3GPP), so that in following descriptions, a long term evolution (LTE) technique is used in collaboration with a commonly used wireless communication technique (for example, code division multiple access (CDMA), WIFI, etc.) to implement the D2D communication. However, those skilled in the art could extend the authentication technique disclosed by the disclosure to related communication protocols and systems, for example, a communication system in which the user equipment are only required to perform authentication for D2D communication through the authentication server, and then the user equipment could direct communicate with each other without performing the communication through a communication processing device (for example, a BS or a wireless AP).

The authentication system 100 includes an authentication server 110 and at least one user equipment UE1-UE3. The authentication server 110 includes communication equipment 120, a management unit 150 and an authentication unit 160. The communication equipment 120 may include a D2D communication controller 130 and a BS 140. The BS 140 of the communication equipment 120 communicates with the user equipment UE1-UE3 through a network protocol (for example, the LTE) complied with the embodiment of the disclosure, and the D2D communication controller 130 is configured to process the D2D communication within a communication range of the communication equipment 120. In the present embodiment, the D2D communication controller 130 is disposed in the BS 140 to from a communication processing device of the communication equipment 120. And, in other embodiments, the D2D communication controller 130 could also be disposed in the management unit 150 and/or the authentication unit 160, or could be an independent entity component, and a connection relationship of an entity structure thereof is not limited as that shown in FIG. 1. In the present embodiment, the communication processing device (for example, the BS 140) used by the communication protocol could be a communication BS used by worldwide interoperability for microwave access (WiMAX) and $3^{rd}$-generation (3G) technique, a wireless AP used by WIFI or eNodeB equipment used by LTE. The user equipment UE1-UE3 could be mobile phones, tablet PCs, notebook computers, etc. complied with the communication protocol of the present embodiment. The management unit 150 could be a mobile management entity (MME) in the LTE technique, and the authentication unit 160 could be a home subscriber server (HSS) in the LTE technique.

To facilitate the authentication server 110 in a core network (i.e. a network service provider of the disclosure) managing the whole D2D communication network, each of the user equipment UE1-UE3 has to gain authorization for the D2D communication. Therefore, before the D2D communication network is formed, the user equipment UE1-UE3 proposes communication requests to the core network at the beginning for gaining the authorization for the D2D communication. In the disclosure, during a process that the user equipment UE1-UE3 gains authorization for the D2D communication, the LTE is used as an example for descriptions, though those skilled in the art could also use the wireless network protocols such as WIFI, CDMA, etc. to achieve the same effect. Moreover, during the process that the user equipment UE1-UE3 gains authorization for the D2D communication, those skilled in the art could add a related mechanism for determining whether the user pays, so as to achieve a user-pay effect. After the D2D communication authorization of the core network is gained, the user equipment UE1-UE3 performs authentication and authorization to the D2D communication controller 130 of the authentication server 110 to obtain the service for the D2D communication.

The authenticated user equipment could direct establish the D2D communication with other adjacent authenticated user equipment without performing the device-to-device communication through the authentication server 110 and the D2D communication controller 130. An expiration date of an equipment key obtained by the authenticated user equipment could be set by those skilled in the art according to an actual requirement. For example, the authenticated user equipment could perform D2D communication with other specific or unspecific authenticated user equipment within the expiration date of the key, and after the expiration date of the key is expired, the user equipment has to re-perform authentication through the authentication server 110, or otherwise the D2D communication controller 130 could retrieve a network resource originally provided to the authenticated user equipment. Moreover, the authentication server 110 could assist the authenticated user equipment to learn other adjacent authenticated user equipment or assist the authenticated user equipment to establish the D2D communication with the other adjacent authenticated user equipment. Pluralities of embodiments are provided below to describe the authentication method for D2D communication of the disclosure.

Figure 2:
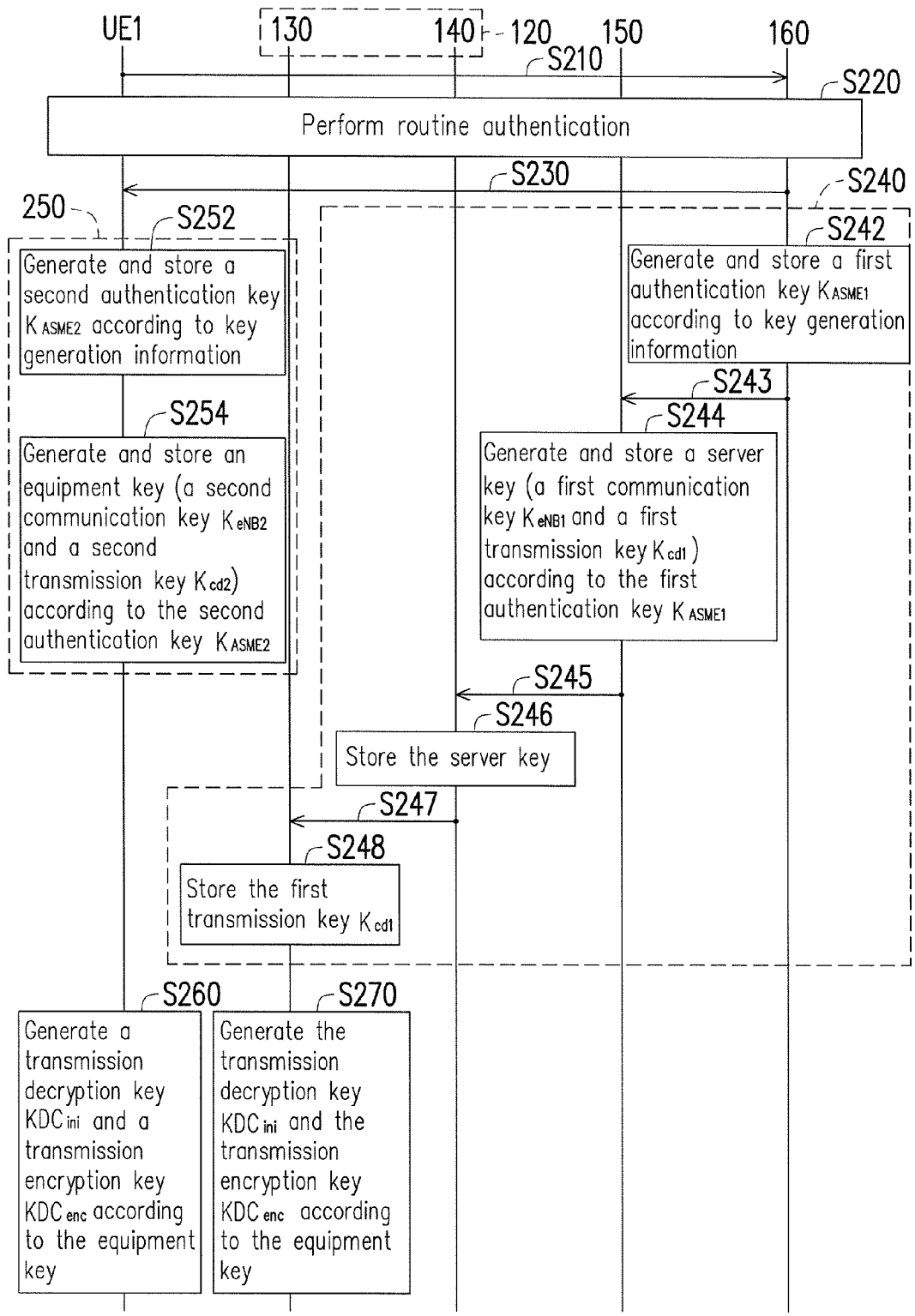
FIG. 2 is a flowchart illustrating an authentication method for D2D communication according to a first embodiment of the disclosure.

FIG. 2 is a flowchart illustrating an authentication method for D2D communication according to a first embodiment of the disclosure. Particularly, FIG. 2 illustrates a situation that the single user equipment UE1 sends a request to the authentication server 110 to obtain the authentication for D2D communication. Referring to FIG. 1 and FIG. 2, the communication equipment 120 (i.e. the D2D communication controller 130 and the BS 140) of the authentication server 110 is located within a communication range of the user equipment UE1. It is assumed that the user equipment UE1 hopes to obtain the authentication for D2D communication from the authentication server 110, the user equipment UE1 sends a connection request for D2D communication to the authentication server 110 (step S210). When the user equipment UE1 sends the connection request for D2D communication to the BS 140 of the authentication server 110, the BS 140 transmits the connection request to the management unit 150 and the authentication unit 160 to perform a routine authentication procedure (step S220). The aforementioned routine authentication procedure could refer to an authentication flow used by a related network protocol, for example, an authentication procedure of the LTE. For example, the connection request sent by the user equipment UE1 includes information such as international mobile subscriber identity (IMSI), server network identity (SN ID) and service type, etc., and after the authentication unit 160 receives the connection request, it performs ID verification according to information of SN ID, IMSI, etc.

When the routine authentication procedure is successful, the authentication unit 160 generates key generation information corresponding to the user equipment UE1, and provides the key generation information to the user equipment UE1 (step S230). The key generation information may include information blocks such as a random number, a sequence parameter related to the user equipment UE1, a ciphering key (CK), an integrity key (IK), etc. A purpose of transmitting the key generation information is to ensure that the user equipment UE1 and the authentication server 110 generate a same key to implement the authentication for D2D communication, so that the key generation information generated by the authentication server 110 is equivalent to the key generation information received by the user equipment UE1 in the step S230.

In step S240, the authentication unit 160, the management unit 150 and the communication equipment 120 in the authentication server 110 generate a server key located at the authentication server 110 according to the key generation information by using a key derivation procedure (or referred to as a key derivation function (KDF). Details of the step S240 is described below. When the routine authentication procedure of the step S220 is successful, the authentication unit 160 generates a first authentication key $K_{ASME1}$ according to a result of the routine authentication procedure (for example, the ciphering key (CK) and the integrity key (IK)) (step S242), and transmits the first authentication key $K_{ASME1}$ to the management unit 150 (step S243). The result of the routine authentication procedure is the aforementioned key generation information. The management unit 150 stores the received first authentication key $K_{ASME1}$, and respectively generates and stores a first communication key $K_{eNB1}$ and a first transmission key $K_{cd1}$ to serve as the aforementioned server key according to the first authentication key $K_{ASME1}$ (step S244), and transmits the server key to the BS 140 in the communication equipment 120 (step S245). The BS 140 stores the server key (i.e. the first communication key $K_{eNB1}$ and the first transmission key $K_{cd1}$) (step S246), and transmits the first transmission key $K_{cd1}$ to the D2D communication controller 130 (step S247). The D2D communication controller 130 stores the first transmission key $K_{cd1}$ (step S248) to serve as an authentication record of the user equipment UE1 for D2D communication.

In step S250 of FIG. 2, the user equipment UE1 generates an equipment key located at the user equipment UE1 according to the key generation information obtained in the step S230 and the key derivation procedure the same with that of the authentication server 110, so as to obtain the authentication for the D2D communication. In step S252 of the present embodiment, the user equipment UE1 obtains the ciphering key CK and the integrity key IK according to the key generation information obtained in the step S230, and generates and stores a second authentication key $K_{ASME2}$ located at the user equipment UE1 according to the ciphering key CK and the integrity key IK by using the key derivation procedure. Theoretically, if none error occurs during transmission of the key generation information, the second authentication key $K_{ASME2}$ is equivalent to the first authentication key $K_{ASME1}$ on the authentication server 110. In step S254, the user equipment UE1 respectively generates and stores a second communication key $K_{eNB2}$ and a second transmission key $K_{cd2}$ according to the second authentication key $K_{ASME2}$ by using the key derivation procedure, where the second communication key $K_{eNB2}$ and the second transmission key $K_{cd2}$ are also referred to as the equipment key. Theoretically, the equipment key is equivalent to the server key. In the present embodiment, the step S240 and the step S250 could be simultaneously executed, or executed in succession, so as to respectively obtain the same equipment key and the server key at the user equipment UE1 and the authentication server 110.

In step S260, the user equipment UE1 generates a transmission decryption key KDCini and a transmission encryption key KDCenc according to the equipment key and the key derivation procedure. Correspondingly, in step S270, the D2D communication controller 130 generates the transmission decryption key KDCini and the transmission encryption key KDCenc according to the server key and the key derivation procedure. In this way, according to the step S260 and the step S270, the user equipment UE1 could communicate with the authentication server 110 through the keys KDCini and KDCenc, and even the user equipment UE1 and the other UE UE2 that has obtained the authentication for D2D communication could direct perform D2D mutual authentication to implement the D2D communication without performing the D2D communication through the authentication server 110.

Figure 3:
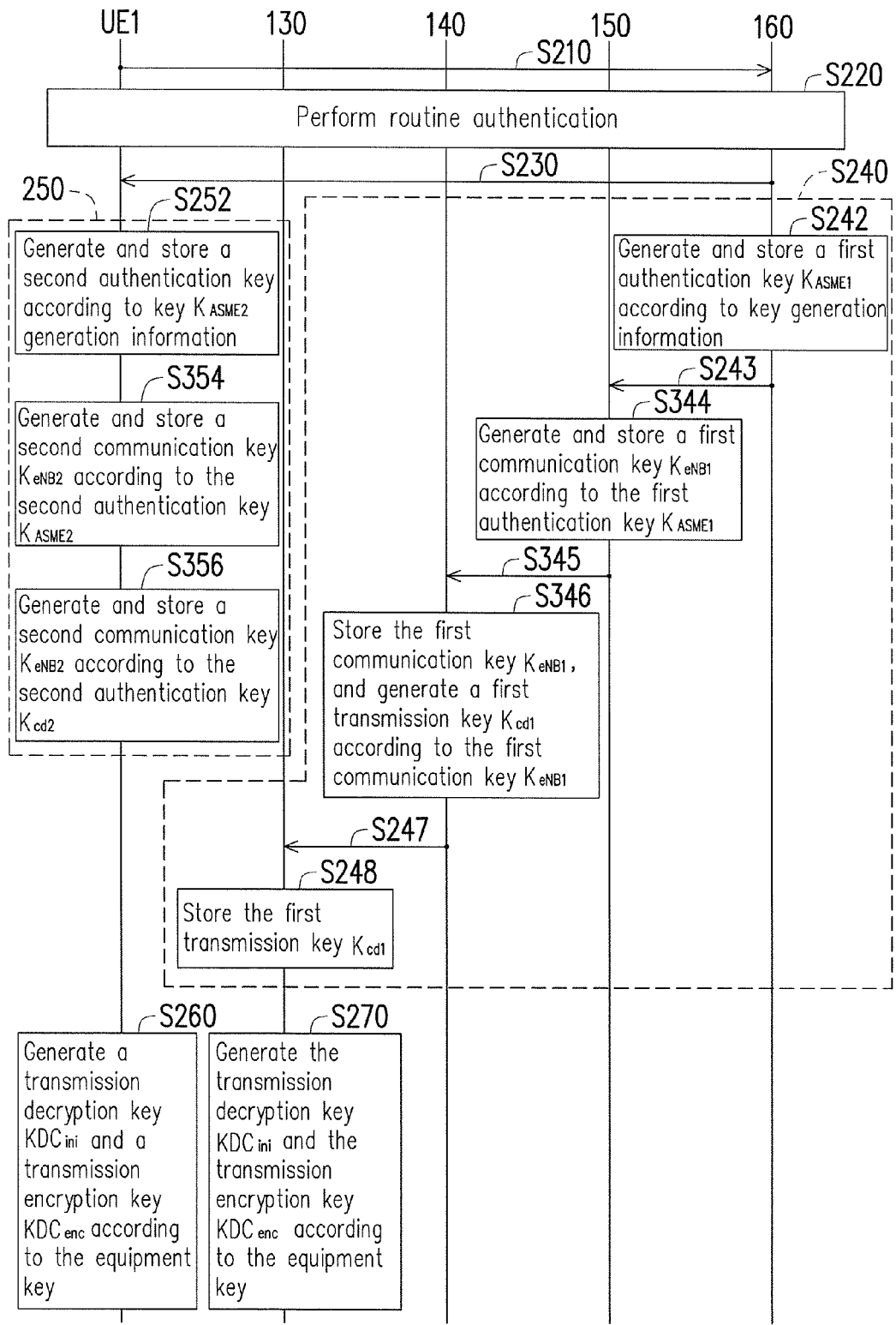
FIG. 3 is a flowchart illustrating an authentication method for D2D communication according to a second embodiment of the disclosure.

FIG. 3 is a flowchart illustrating an authentication method for D2D communication according to a second embodiment of the disclosure. Similar to the embodiment of FIG. 2, in the embodiment of FIG. 3, the single user equipment UE1 also sends a request to the authentication server 110 to obtain the authentication for D2D communication. However, a difference between the embodiments of FIG. 2 and FIG. 3 is that, in the step S244 of FIG. 2, the management unit 150 respectively generates the first communication key $K_{eNB1}$ and the first transmission key $K_{cd1}$ to serve as the aforementioned server key. In step S344 of FIG. 3, the management unit 150 generates and stores the first communication key $K_{eNB1}$ required by the BS 140 according to the first authentication key $K_{ASME1}$ (step S344), and transmits the first communication key $K_{eNB1}$ to the BS 140 in the communication equipment 120 (step S345). The BS 140 stores the first communication key $K_{eNB1}$, and generates and stores the first transmission key $K_{cd1}$ according to the first communication key $K_{eNB1}$ (S346), and then transmits the first transmission key $K_{cd1}$ to the D2D communication controller 130 (step S247). The first communication key $K_{eNB1}$ and the first transmission key $K_{cd1}$ are referred to as the server key.

Similarly, a combination of a step S354 and a step S346 in FIG. 3 is similar to the step S254 of FIG. 2, namely, the user equipment UE1 generates and stores the second communication key $K_{eNB2}$ according to the second authentication key $K_{ASME2}$ by using the key derivation procedure (step S354), and then generates and stores the second transmission key $K_{cd2}$ according to the second communication key $K_{eNB2}$ by using the key derivation procedure (step S356).

Figure 4:
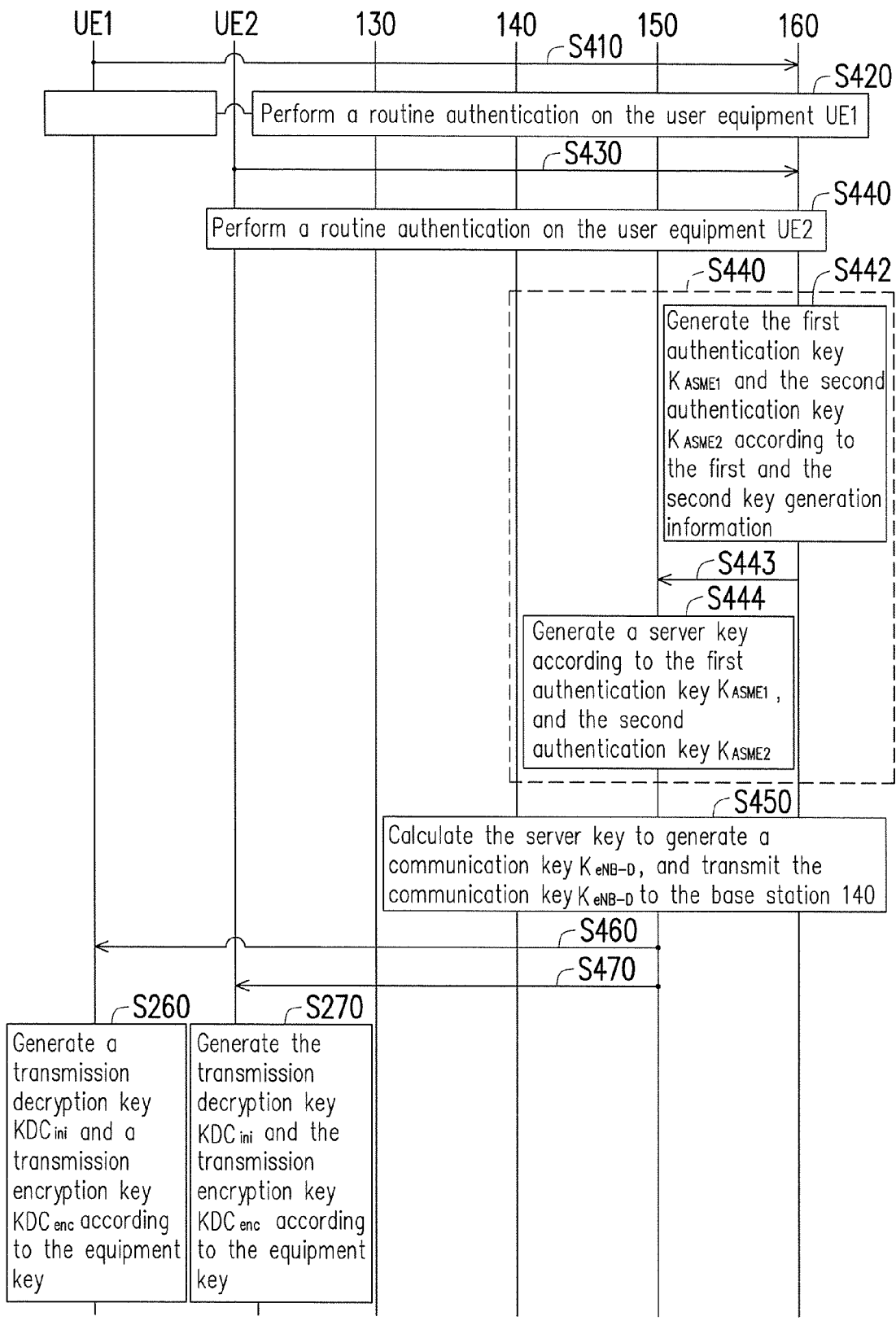
FIG. 4 is a flowchart illustrating an authentication method for D2D communication according to a third embodiment of the disclosure.

FIG. 4 is a flowchart illustrating an authentication method for D2D communication according to a third embodiment of the disclosure. Particularly, FIG. 4 illustrates a situation that the user equipment UE1 and UE2 send requests to the authentication server 110 to obtain the authentication for D2D communication between the user equipment UE1 and UE2. The communication equipment 120 in the authentication server 110 is located within communication ranges of the user equipment UE1 and the user equipment UE2. Compared to the embodiments of FIG. 2 and FIG. 3, the user equipment UE2 is added to the embodiment of FIG. 4. The user equipment UE1 sends a connection request for D2D communication to the authentication unit 160 in the authentication server 110 (step S410). The authentication unit 160 in the authentication server 110 performs a routine authentication procedure on the user equipment UE1, and provides first key generation information to the user equipment UE1. Similarly, the user equipment UE2 sends a connection request for D2D communication to the authentication unit 160 in the authentication server 110 (step S430). The authentication unit 160 in the authentication server 110 performs a routine authentication procedure on the user equipment UE2, and provides second key generation information to the user equipment UE2. Details of the above steps could refer to related descriptions of the aforementioned embodiment, which are not repeated.

One of the authentication unit 160 and the management unit 150 in the authentication server 110 generates a server key according to the aforementioned first and second key generation information and the key derivation procedure (step S440). In detail, the authentication unit 160 generates the first authentication key $K_{ASME1}$ corresponding to the user equipment UE1 and the second authentication key $K_{ASME2}$ corresponding to the user equipment UE2 according to a result of the routine authentication procedure (i.e., the first and the second key generation information, for example, the ciphering key CK and the integrity key IK) (step S442), and transmits the first and the second authentication keys $K_{ASME1}$ and $K_{ASME2}$ to the management unit 150 (step S443). The management unit 150 generates a server key according to the first authentication key $K_{ASME1}$, the second authentication key $K_{ASME2}$ and the key derivation procedure (S444).

In step S450, the authentication server 110 calculates the common server key to generate a communication key $K_{eNB-D}$, and transmits the communication key $K_{eNB-D}$ to the BS 140. In the present embodiment, one of the authentication unit 160, the management unit 150 and the BS 140 could be used to calculate the server key to generate the communication key $K_{eNB-D}$. Moreover, the authentication server 110 also takes the server key as the equipment key described in the first and the second embodiments for transmitting to the user equipment UE1 (step S460) and the user equipment UE2 (step S470). In this way, the user equipment UE1 and UE2 obtain the authentication for D2D communication, and directly perform D2D communication and encryption and decryption operations by using the transmission decryption key $KDC_{ini}$ and the transmission encryption key $KDC_{enc}$ obtained in the steps S260 and S270 without performing the D2D communication through the authentication server 110.

In the aforementioned first to third embodiments, how the user equipment UE1-UE3 obtain the authentication for D2D communication from the authentication server 110 is described. After the authentication for D2D communication of the authentication server 110 is completed, the user equipment (for example, UE1) does not necessarily have found the other user equipment intending to perform the D2D communication as that does in the third embodiment, but usually searches the user equipment by itself, or finds the adjacent and authenticated user equipment through the authentication server (device searching) to perform the D2D mutual authentication. The aforementioned "device searching" refers to a process that the user equipment (for example, UE1) that have completed the authentication for D2D communication searches the adjacent authenticated user equipment (for example, UE2), and confirms that the user equipment UE2 is intended to perform communication. The so-called "D2D mutual authentication" of the disclosure refers to operations of mutual identification, mutual authentication, and transmission and verification of security key between the user equipment (for example, UE1) that have completed the authentication for D2D communication and the other adjacent authenticated user equipment (for example, UE2) after confirming that the mutual communication is to be performed.

Figure 5:
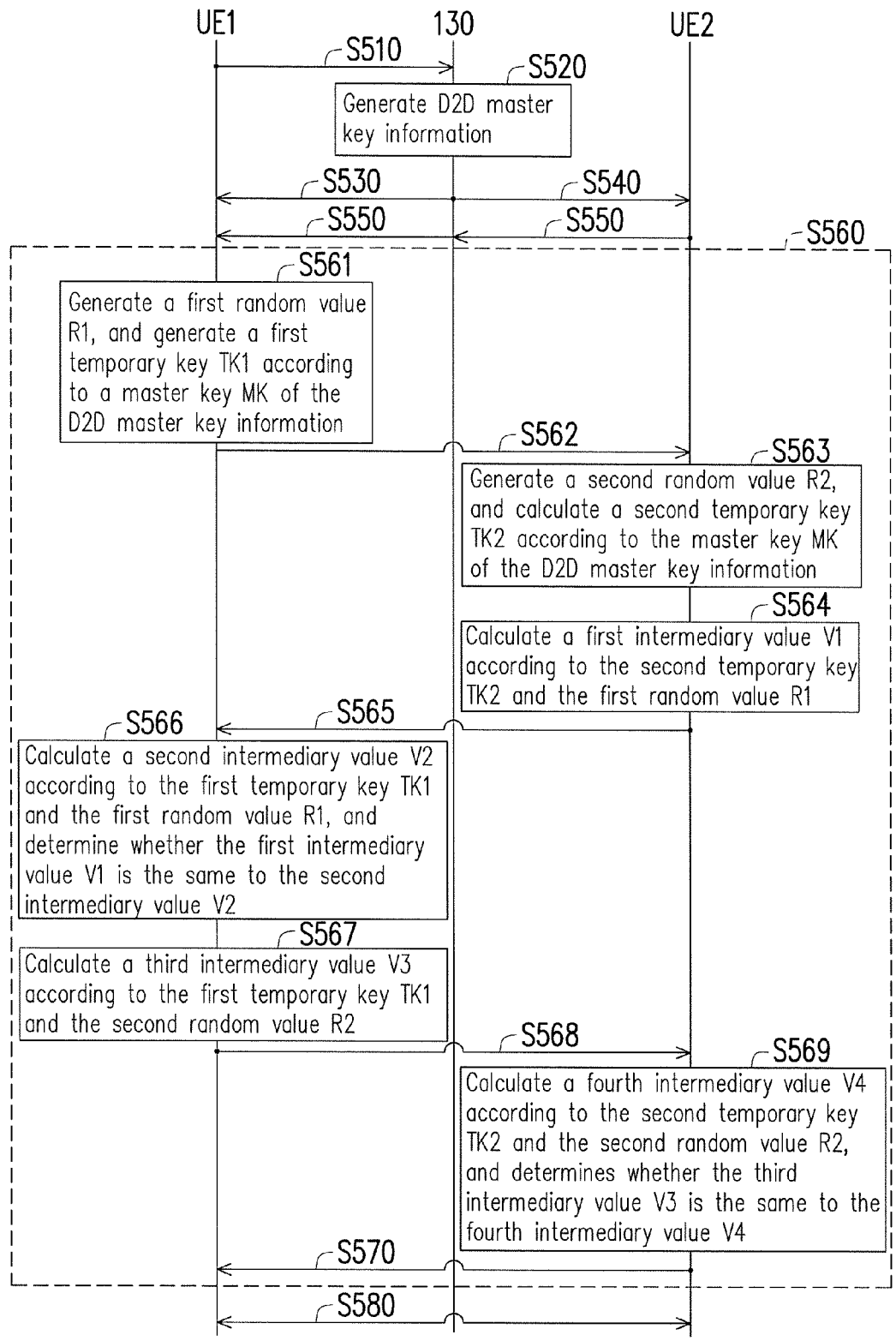
FIG. 5 is a detailed flowchart illustrating an authentication method for D2D communication according to a fourth embodiment of the disclosure.

FIG. 5 is a detailed flowchart illustrating an authentication method for D2D communication according to a fourth embodiment of the disclosure, in which device searching and D2D mutual authentication between the user equipment UE1 and the user equipment UE2 are particularly described. In other words, the fourth embodiment could be implemented in collaboration with the aforementioned first to third embodiments. After both of the user equipment UE1 and UE2 obtains the authentication for D2D communication, if the user equipment UE1 is intended to perform the D2D communication with the user equipment UE2, the user equipment UE1 sends a D2D communication request related to the user equipment UE2 to the D2D communication controller 130 in the authentication server 110 (step S510). The D2D communication controller 130 receives the D2D communication request to generate D2D master key information (step S520). Then, the D2D communication controller 130 transmits the D2D master key information to the user equipment UE1 (step S530) and the user equipment UE2 (step S540).

After the user equipment UE2 receives the D2D master key information, the user equipment UE2 determines whether to communicate with the user equipment UE1, and transmits a communication response to the D2D communication controller 130 (step S550). The D2D communication controller 130 determines whether to agree the D2D communication between the user equipment UE1 and UE2 according to the communication response. When the communication response of the user equipment UE2 agrees to communicate with the user equipment UE1, the D2D communication controller 130 notifies the user equipment UE1 to complete the "device searching". Thus, the user equipment UE1 and UE2 performs the D2D mutual authentication (step S560), and performs direct D2D communication after the D2D mutual authentication is successful (step S580).

In the present embodiment, the D2D master key information mainly includes a master key MK (for example, the aforementioned first transmission key $K_{cd1}$) and key valid information Nonce. The key valid information Nonce determines an expiration date of the first transmission key $K_{cd1}$. For example, if the authentication server 110 allows the user equipment UE1 to use the D2D communication for one month, the key valid information Nonce carries information of "one month".

The step S560 of FIG. 5, i.e. the "D2D mutual authentication" of the disclosure is described in detail below. When the communication response of the user equipment UE2 agrees to communicate with the user equipment UE1 (step S550), the D2D mutual authentication is performed. The "D2D mutual authentication" of the disclosure is schematically described below: the user equipment UE1 generates a first random value R1 and generates a first temporary key TK1 according to the master key MK of the D2D master key information. Correspondingly, the user equipment UE2 generates a second random value R2 and calculates a second temporary key TK2 according to the master key MK of the D2D master key information. Then, the user equipment UE1 and the user equipment UE2 transmit the first temporary key TK1 and the second temporary key TK2 to each other, and perform mutual authentication according to the master key MK of the D2D master key information, the first temporary key TK1 and the second temporary key TK2, such that the user equipment UE1 and the user equipment UE2 are allowed to perform encryption and decryption operations of the D2D communication according to the D2D master key information.

Detailed steps of the "D2D mutual authentication" are as follows. In step S561, the user equipment UE1 generates the first random value R1, and generates the first temporary key TK1 according to the master key MK of the D2D master key information (step S561). Then, the user equipment UE1 transmits the first random value R1 to the user equipment UE2 (step S562). The user equipment UE2 generates the second random value R2, and calculates the second temporary key TK2 according to the master key MK of the D2D master key information (step S563). Then, the user equipment UE2 calculates a first intermediary value V1 according to the second temporary key TK2 and the first random value R1 by using the key derivation procedure (step S564), and the user equipment UE2 transmits the first intermediary value V1 and the second random value R2 to the user equipment UE1 (step S565).

After the user equipment UE1 receives the first intermediary value V1 and the second random value R2, the user equipment UE1 calculates a second intermediary value V2 according to the first temporary key TK1 calculated by itself and the first random value R1, and determines whether the first intermediary value V1 is the same to the second intermediary value V2 (step S566). When the first intermediary value V1 is the same to the second intermediary value V2, the user equipment UE1 calculates a third intermediary value V3 according to the first temporary key TK1 and the second random value R2 (step S567), and transmits the third intermediary value V3 to the user equipment UE2 (step S568).

After the user equipment UE2 receives the third intermediary value V3, the user equipment UE2 calculates a fourth intermediary value V4 according to the second temporary key TK2 and the second random value R2, and determines whether the third intermediary value V3 is the same to the fourth intermediary value V4 (step S569). If the third intermediary value V3 is the same to the fourth intermediary value V4, the user equipment UE2 allows the user equipment UE1 to perform the D2D communication and the encryption and decryption operations during the communication according to the D2D master key information (step S570). According to the above descriptions, it is known that the D2D mutual authentication (the step S560) and the follow-up D2D communication (step S580) are performed without using the D2D communication controller 130.

Figure 6:
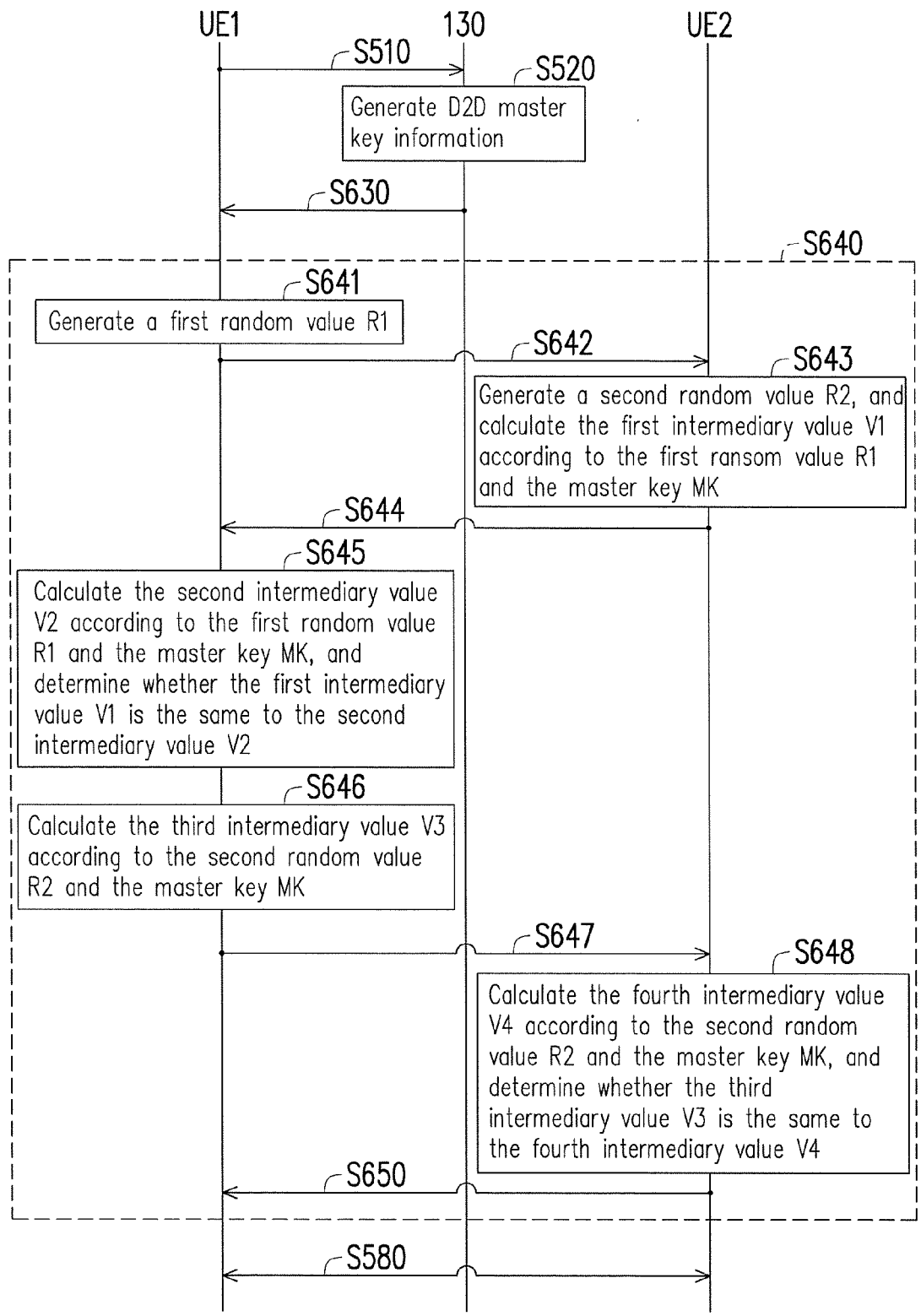
FIG. 6 is a detailed flowchart illustrating an authentication method for D2D communication according to a fifth embodiment of the disclosure.

In the embodiment of FIG. 5, the user equipment UE1 and UE2 could all perform communication with the D2D communication controller 130, and in a following embodiment of FIG. 6, the user equipment UE1 could perform communication with the D2D communication controller 130 and the user equipment UE2, though the user equipment UE2 could not perform communication with the D2D communication controller 130 and does not have the D2D master key information. FIG. 6 is a detailed flowchart illustrating an authentication method for D2D communication according to a fifth embodiment of the disclosure. The fifth embodiment of the disclosure could also be implemented in collaboration with the aforementioned first to the third embodiments. After both of the user equipment UE1 and UE2 obtains the authentication for D2D communication, since the user equipment UE2 does not have the D2D master key information, the user equipment UE1 sends the D2D communication request related to the user equipment UE2 to the D2D communication controller 130 (step S510), and the D2D communication controller 130 receives the D2D communication request to generate the D2D master key information (step S520). Then, the D2D communication controller 130 transmits the D2D master key information to the user equipment UE1 (step S630) and could not transmit the same to the user equipment UE2.

The user equipment UE1 and UE2 performs D2D mutual authentication in step S640. In detail, when the user equipment UE1 receives the D2D master key information, and the user equipment UE2 does not have the D2D master key information, the user equipment UE1 generates the first random value R1, and transmits the first random value R1 and the master key MK of the D2D master key information to the user equipment UE2. The user equipment UE2 generates the second random value R2 and transmits the same to the user equipment UE1. The user equipment UE1 and the user equipment UE2 perform the mutual authentication according to the master key MK of the D2D master key information, the first random value R1 and the second random value R2, such that the user equipment UE1 and the user equipment UE2 could perform the encryption and decryption operations of the D2D communication according to the D2D master key information.

In detail, referring to related steps S641-S650 of FIG. 6, the user equipment UE1 generates the first random value R1 (step S641), and transmits the first random value R1 and the master key MK of the D2D master key information to the user equipment UE2 (step S642). After receiving the first random value R1 and the master key MK, the user equipment UE2 generates the second random value R2, and calculates the first intermediary value V1 according to the first ransom value R1 and the master key MK (step S643). Then, the user equipment UE2 transmits the first intermediary value V1 and the second random value R2 to the user equipment UE1 (step S644).

After receiving the first intermediary value V1 and the second random value R2, the user equipment UE1 calculates the second intermediary value V2 according to the first random value R1 and the master key MK, and determines whether the first intermediary value V1 is the same to the second intermediary value V2 (step S645). When the first intermediary value V1 is the same to the second intermediary value V2, the user equipment UE1 calculates the third intermediary value V3 according to the second random value R2 and the master key MK (step S646), and transmits the third intermediary value V3 to the user equipment UE2 (step S647).

After receiving the third intermediary value V3, the user equipment UE2 calculates the fourth intermediary value V4 according to the second random value R2 and the master key MK, and determines whether the third intermediary value V3 is the same to the fourth intermediary value V4 (step S648). When the third intermediary value V3 is the same to the fourth intermediary value V4, the user equipment UE2 allows the user equipment UE1 to perform the encryption and decryption operations of D2D communication according to the D2D master key information (step S650), and after the D2D mutual authentication is successful, the user equipment UE1 and UE2 could directly perform the D2D communication (step S580).

Figure 7:
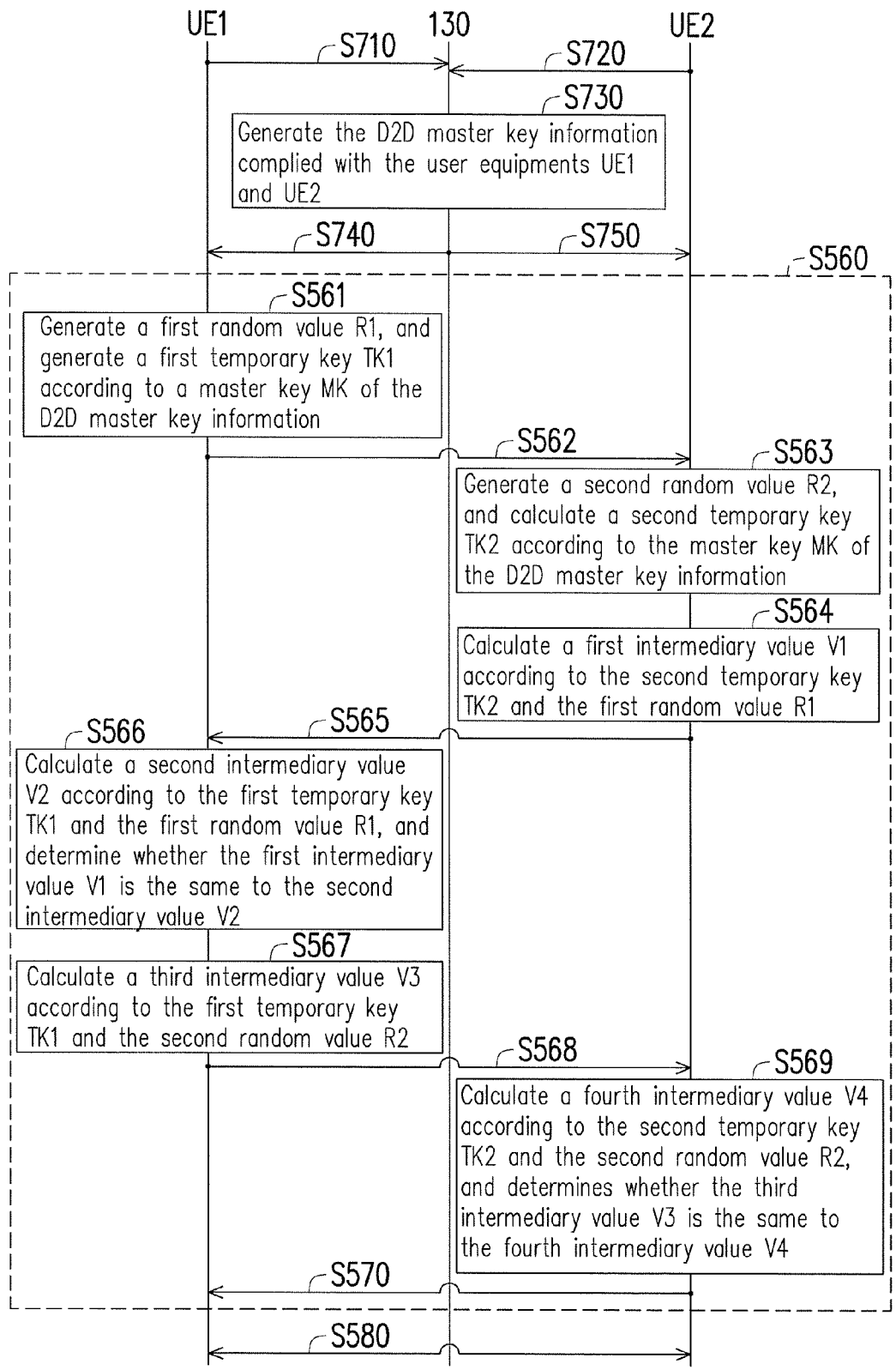
FIG. 7 is a detailed flowchart illustrating an authentication method for D2D communication according to a sixth embodiment of the disclosure.

FIG. 7 is a detailed flowchart illustrating an authentication method for D2D communication according to a sixth embodiment of the disclosure, in which device searching and D2D mutual authentication between the user equipment UE1 and the user equipment UE2 are particularly described. Similar to the third embodiment, after both of the user equipment UE1 and UE2 obtains the authentication for the D2D communication, the user equipment UE1 and UE2 respectively sends a D2D communication request to the D2D communication controller 110 in the authentication server 110 (step S710 and S720). The D2D communication controller 130 receives the two D2D communication requests to generate D2D master key information complied with the user equipment UE1 and UE2 (step S730), and transmits the D2D master key information to the user equipment (step S740) and the user equipment UE2 (step S750) to achieve device searching and implement the follow-up D2D mutual authentication. Particularly, steps of the D2D mutual authentication of FIG. 7 are the same to the steps S560-S580 of the embodiment of FIG. 5, which are not repeated.

Moreover, referring to FIG. 7, if the user equipment UE1 and UE2 already has the respective D2D master key information, the steps of "device searching" (steps S710-S750) are not required, and the steps S560-S580 are directly executed to perform the "D2D mutual authentication" and "D2D communication". The "D2D mutual authentication" is described in the step S560 of FIG. 5, which is schematically described below. The user equipment UE1 generates the first random value R1, and generates the first temporary key TK1 according to the master key MK of the D2D master key information. Correspondingly, the user equipment UE2 generates the second random value R2, and calculates the second temporary key TK2 according to the master key MK of the D2D master key information. Then, the user equipment UE1 and the user equipment UE2 transmit the first temporary key TK1 and the second temporary key TK2 to each other, and perform mutual authentication according to the master key MK of the D2D master key information, the first temporary key TK1 and the second temporary key TK2, such that the user equipment UE1 and the user equipment UE2 could perform encryption and decryption operations of the D2D communication according to the D2D master key information.

Particularly, besides the master key MK and the key valid information Nonce, the D2D master key information may further include a parameter of key index. The key index is used to notify the user equipment UE1 and UE2 to perform key allocation and key updating. The user equipment UE1 and UE2 could regenerate an encryption key (EK) and the integrity key (IK) required during the D2D communication by notifying the key index to each other, and the user equipment UE1 and UE2 adopts the regenerated encryption key and the integrity key to perform the D2D communication.

Figure 8:
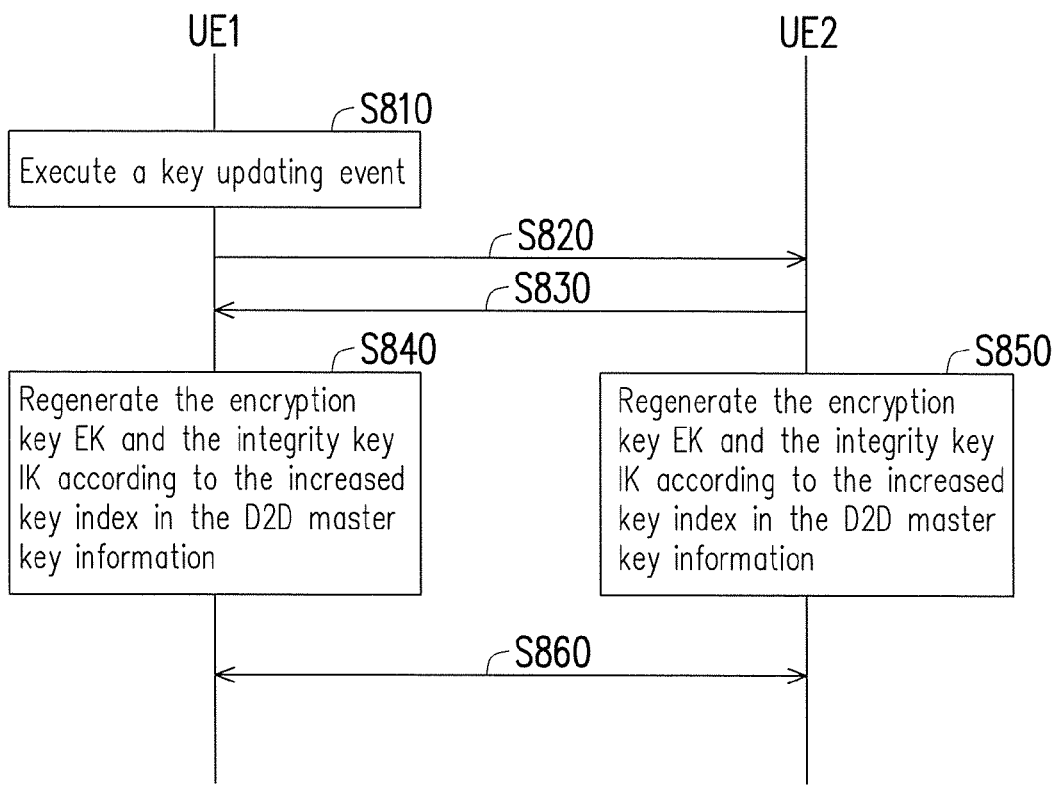
FIG. 8 is a detailed flowchart illustrating an authentication method for D2D communication according to a seventh embodiment of the disclosure.

An embodiment of FIG. 8 is used to describe how to perform key updating between the user equipment UE1 and UE2. FIG. 8 is a detailed flowchart illustrating an authentication method for D2D communication according to a seventh embodiment of the disclosure, and the seventh embodiment is adapted to the aforementioned first to sixth embodiments. The user equipment UE1 could be triggered by a counter or user's request to execute a key updating event (step S810). In step S820, the user equipment UE1 sends a key index updating request to the user equipment UE2, so as to increase the key index in the D2D master key information by a predetermined value N (step S820). Then, the user equipment UE2 transmits back a key index updating response (step S830). In this way, the user equipment UE1 and UE2 respectively regenerates the encryption key EK and the integrity key IK required during the D2D communication according to the increased key index (i.e. index+N) in the D2D master key information (steps S840 and S850). The user equipment UE1 and UE2 adopts the generated encryption key EK and the integrity key IK to perform the D2D communication (step S860).

In summary, the authentication system and the authentication method of the disclosure implement the authentication mechanism for D2D communication, where the user equipment first performs the authentication for the D2D communication through the authentication server and obtains a corresponding authentication key, and after obtaining the authentication for the D2D communication, the user equipment is able to directly communicate with the other authenticated user equipment without performing the communication through a base station or a wireless access point. The authenticated user equipment of the disclosure could implement D2D mutual authentication, D2D communication mechanism, key distribution and key updating with other user equipment according to key valid information set in the authentication key, and a charging mechanism and security mechanism could be added to a determination mechanism of the D2D authentication, so as to protect the interests of manufacturers implementing the D2D communication system and interests of users using the D2D communication system.

It will be apparent to those skilled in the art that various modifications and variations could be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An authentication system for device-to-device communication, comprising:
    first user equipment; and
    an authentication server, communicating with the first user equipment, comprises:
        communication equipment, communicating with the first user equipment through a network protocol, and processing device-to-device communication within a communication range of the communication equipment; and
        a processor configured to execute a management unit and an authentication unit, wherein after the management unit and the authentication unit receive a connection request sent by the first user equipment through the communication equipment, the authentication unit performs an authentication procedure on the first user equipment,
        when the authentication procedure is successful, the authentication unit generates a first authentication key according to a result of the authentication procedure, and transmits the first authentication key to the management unit, the management unit respectively generates a first communication key and a first transmission key according to the first authentication key to serve as a server key, and the processor transmits the server key to the communication equipment,
    wherein when the first user equipment sends the connection request to the authentication server, the authentication server performs the authentication procedure on the first user equipment and provides key generation information to the first user equipment,
    the authentication server generates the server key according to the key generation information and a key derivation procedure, and
    the first user equipment generates an equipment key according to the key generation information and the key derivation procedure, so as to obtain device-to-device authentication, such that the first user equipment and a second user equipment obtaining the device-to-device authentication are able to directly perform the device-to-device communication without performing the device-to-device communication through the authentication server.

2. The authentication system for device-to-device communication as claimed in claim 1, wherein the communication equipment comprises:
    a communication processing device, communicating with the first user equipment through the network protocol; and
    a device-to-device communication controller, processing the device-to-device communication within the communication range of the communication equipment.

3. The authentication system for device-to-device communication as claimed in claim 1, wherein after the first user equipment obtains the device-to-device authentication, the first user equipment sends a device-to-device communication request related to the second user equipment to the device-to-device communication controller in the authentication server, the device-to-device communication controller receives the device-to-device communication request to generate device-to-device master key information, and transmits the device-to-device master key information to the first user equipment and the second user equipment to facilitate the first user equipment and the second user equipment to perform a mutual authentication and communication.

4. The authentication system for device-to-device communication as claimed in claim 3, wherein the second user equipment determines whether to communicate with the first user equipment after receiving the device-to-device master key information, and transmits back a communication response to the device-to-device communication controller, and the device-to-device communication controller determines whether to agree the device-to-device communication between the first user equipment and the second user equipment according to the communication response.

5. The authentication system for device-to-device communication as claimed in claim 4, wherein when the communication response of the second user equipment agrees to communicate with the first user equipment, the mutual authentication is performed,
    wherein the first user equipment generates a first random value and generates a first temporary key according to a master key of the device-to-device master key information, the second user equipment generates a second random value and calculates a second temporary key according to the master key of the device-to-device master key information, the first user equipment and the second user equipment transmit the first temporary key and the second temporary key to each other, and perform the mutual authentication according to the master key of the device-to-device master key information, the first temporary key and the second temporary key, such that the first user equipment and the second user equipment are allowed to perform encryption and decryption operations of the device-to-device communication according to the device-to-device master key information.

6. The authentication system for device-to-device communication as claimed in claim 5, wherein the first user equipment generates the first random value and generates the first temporary key according to the master key of the device-to-device master key information, and transmits the first random value to the second user equipment;
    the second user equipment generates the second random value and calculates the second temporary key according to the master key of the device-to-device master key information;
    the second user equipment calculates a first intermediary value according to the second temporary key and the first random value, and transmits the first intermediary value and the second random value to the first user equipment;

the first user equipment calculates a second intermediary value according to the first temporary key and the first random value, and determines whether the first intermediary value is the same to the second intermediary value;

when the first intermediary value is the same to the second intermediary value, the first user equipment calculates a third intermediary value according to the first temporary key and the second random value, and transmits the third intermediary value to the second user equipment;

the second user equipment calculates a fourth intermediary value according to the second temporary key and the second random value, and determines whether the third intermediary value is the same to the fourth intermediary value; and when the third intermediary value is the same to the fourth intermediary value, the second user equipment allows the first user equipment to perform encryption and decryption operations of the device-to-device communication according to the device-to-device master key information.

7. The authentication system for device-to-device communication as claimed in claim 3, wherein the mutual authentication is that when the first user equipment receives the device-to-device master key information and the second user equipment does not have the device-to-device master key information, the first user equipment generates the first random value, and transmits the first random value and the master key of the device-to-device master key information to the second user equipment; the second user equipment generates the second random value and transmits the second random value to the first user equipment, the first user equipment and the second user equipment perform the mutual authentication according to the master key of the device-to-device master key information, the first random value and the second random value, such that the first user equipment and the second user equipment are allowed to perform encryption and decryption operations of the device-to-device communication according to the device-to-device master key information.

8. The authentication system for device-to-device communication as claimed in claim 7, wherein the first user equipment generates the first random value and transmits the first random value and the master key of the device-to-device master key information to the second user equipment;

the second user equipment generates the second random value and calculate a first intermediary value according to the first random value and the master key, and transmits the first intermediary value and the second random value to the first user equipment;

the first user equipment calculates a second intermediary value according to the first random value and the master key, and determines whether the first intermediary value is the same to the second intermediary value;

when the first intermediary value is the same to the second intermediary value, the first user equipment calculates a third intermediary value according to the second random value and the master key, and transmits the third intermediary value to the second user equipment;

the second user equipment calculates a fourth intermediary value according to the second random key and the master key, and determines whether the third intermediary value is the same to the fourth intermediary value;

when the third intermediary value is the same to the fourth intermediary value, the second user equipment allows the first user equipment to perform encryption and decryption operations of the device-to-device communication according to the device-to-device master key information, the first user equipment generates a first temporary key according to the master key of the device-to-device master key information, and transmits the first random value to the second user equipment;

the second user equipment generates the second random value and calculates a second temporary key according to the master key of the device-to-device master key information;

the second user equipment calculates the first intermediary value according to the second temporary key and the first random value, and transmits the first intermediary value and the second random value to the first user equipment;

the first user equipment calculates a second intermediary value according to the first temporary key and the first random value, and determines whether the first intermediary value is the same to the second intermediary value;

when the first intermediary value is the same to the second intermediary value, the first user equipment calculates a third intermediary value according to the first temporary key and the second random value, and transmits the third intermediary value to the second user equipment;

the second user equipment calculates a fourth intermediary value according to the second temporary key and the second random value, and determines whether the third intermediary value is the same to the fourth intermediary value; and when the third intermediary value is the same to the fourth intermediary value, the second user equipment allows the first user equipment to perform encryption and decryption operations of the device-to-device communication according to the master key.

9. The authentication system for device-to-device communication as claimed in claim 1, wherein after the first user equipment obtains the device-to-device authentication, the first user equipment and the second user equipment send a device-to-device communication request to the device-to-device communication controller in the authentication server, the device-to-device communication controller receives the device-to-device communication request to generate device-to-device master key information, and transmits the device-to-device master key information to the first user equipment and the second user equipment to facilitate the first user equipment and the second user equipment to perform mutual authentication and communication.

10. The authentication system for device-to-device communication as claimed in claim 9, wherein the mutual authentication is that the first user equipment generates the first random value and generates the first temporary key according to the master key of the device-to-device master key information, the second user equipment generates the second random value and calculates the second temporary key according to the master key of the device-to-device master key information, the first user equipment and the second user equipment transmit the first temporary key and the second temporary key to each other and perform the mutual authentication according to the master key of the device-to-device master key information, the first temporary key and the second temporary key, such that the first user equipment and the second user equipment are allowed to perform encryption and decryption operations of the device-to-device communication according to the device-to-device master key information.

11. The authentication system for device-to-device communication as claimed in claim 10, wherein the first user equipment generates the first random value and generates the first temporary key according to the master key of the device-to-device master key information, and transmits the first random value to the second user equipment;

the second user equipment generates the second random value and calculates a second temporary key according to the master key of the device-to-device master key information;

the second user equipment calculates a first intermediary value according to the second temporary key and the first random value, and transmits the first intermediary value and the second random value to the first user equipment;

the first user equipment calculates a second intermediary value according to the first temporary key and the first random value, and determines whether the first intermediary value is the same to the second intermediary value;

when the first intermediary value is the same to the second intermediary value, the first user equipment calculates a third intermediary value according to the first temporary key and the second random value, and transmits the third intermediary value to the second user equipment;

the second user equipment calculates a fourth intermediary value according to the second temporary key and the second random value, and determines whether the third intermediary value is the same to the fourth intermediary value; and when the third intermediary value is the same to the fourth intermediary value, the second user equipment allows the first user equipment to perform encryption and decryption operations of the device-to-device communication according to the device-to-device master key information.

12. The authentication system for device-to-device communication as claimed in claim 1, wherein the first user equipment and the second user equipment perform the mutual authentication after obtaining the device-to-device master key information, the first user equipment generates a first random value and generates a first temporary key according to a master key of the device-to-device master key information, the second user equipment generates a second random value and calculates a second temporary key according to the master key of the device-to-device master key information, the first user equipment and the second user equipment transmit the first temporary key and the second temporary key to each other and perform the mutual authentication according to the master key of the device-to-device master key information, the first temporary key and the second temporary key, such that the first user equipment and the second user equipment are allowed to perform encryption and decryption operations of the device-to-device communication according to the device-to-device master key information.

13. The authentication system for device-to-device communication as claimed in claim 1, wherein during the device-to-device communication, the first user equipment and the second user equipment regenerate an encryption key and an integrity key required in the device-to-device communication according to a key index in the device-to-device master key information, and the first user equipment and the second user equipment adopt a regenerated encryption key and the integrity key to perform the device-to-device communication.

14. The authentication system for device-to-device communication as claimed in claim 1, wherein when the first user equipment and the second user equipment perform the device-to-device communication, the first user equipment executes a key updating event, and sends a key index updating request to the second user equipment, so as to increase the key index in the device-to-device master key information by a predetermined value, the first user equipment and the second user equipment regenerate the encryption key and the integrity key required in the device-to-device communication according to the increased key index in the device-to-device master key information, and the first user equipment and the second user equipment adopt the regenerated encryption key and the integrity key to perform the device-to-device communication.

15. An authentication system for device-to-device communication, comprising:

first user equipment and second user equipment; and an authentication server, located within communication ranges of the first user equipment and the second user equipment, comprises:

communication equipment, communicating with the first user equipment through a network protocol, and processing device-to-device communication within a communication range of the communication equipment; and a processor configured to execute a management unit and an authentication unit, wherein after the management unit and the authentication unit receive a connection request sent by the first user equipment through the communication equipment, the authentication unit performs an authentication procedure on the first user equipment, when the authentication procedure is successful, the authentication unit generates a first authentication key according to a result of the authentication procedure, and transmits the first authentication key to the management unit, the management unit respectively generates a first communication key and a first transmission key according to the first authentication key to serve as a server key, and the processor transmits the server key to the communication equipment, wherein when the first user equipment and the second user equipment respectively send the connection request for device-to-device communication to the authentication server, the authentication server performs authentication procedures on the first user equipment and the second user equipment, and respectively provides first key generation information and second key generation information to the first user equipment and the second user equipment, the authentication server generates the server key according to the first key generation information, the second key generation information and a key derivation procedure, and the authentication server respectively transmits the server key to the first user equipment and the second user equipment, such that the first user equipment and the second user equipment obtain device-to-device authentication and directly perform the device-to-device communication without performing the device-to-device communication through the authentication server.

16. The authentication system for device-to-device communication as claimed in claim 15, wherein when the first user equipment sends the connection request to the authentication server, the authentication server performs the authentication procedure on the first user equipment, and provides the key generation information to the first user equipment, the authentication server generates the server key according to the key generation information and the key derivation procedure, and the first user equipment generates an equipment key according to the key generation information and the key derivation procedure, so as to obtain the device-to-device authentication, such that the first user equipment directly performs device-to-device communication with the second user equipment obtaining the device-to-device authentication without performing the device-to-device communication through the authentication server.

17. The authentication system for device-to-device communication as claimed in claim 15, wherein the communication equipment comprises:
   a communication processing device, communicating with the first user equipment through the network protocol; and
   a device-to-device communication controller, processing the device-to-device communication within the communication range of the communication equipment.

18. The authentication system for device-to-device communication as claimed in claim 15, wherein after the first user equipment obtains the device-to-device authentication, the first user equipment sends a device-to-device communication request related to the second user equipment to the device-to-device communication controller in the authentication server, the device-to-device communication controller receives the device-to-device communication request to generate device-to-device master key information, and transmits the device-to-device master key information to the first user equipment and the second user equipment to facilitate the first user equipment and the second user equipment to perform mutual authentication and communication.

19. The authentication system for device-to-device communication as claimed in claim 18, wherein the second user equipment determines whether to communicate with the first user equipment after receiving the device-to-device master key information, and transmits back a communication response to the device-to-device communication controller, and the device-to-device communication controller determines whether to agree the device-to-device communication between the first user equipment and the second user equipment according to the communication response.

20. The authentication system for device-to-device communication as claimed in claim 19, wherein when the communication response of the second user equipment agrees to communicate with the first user equipment, the mutual authentication is performed,
   wherein the first user equipment generates a first random value and generates a first temporary key according to a master key of the device-to-device master key information, the second user equipment generates a second random value and calculates a second temporary key according to the master key of the device-to-device master key information, the first user equipment and the second user equipment transmit the first temporary key and the second temporary key to each other, and perform the mutual authentication according to the master key of the device-to-device master key information, the first temporary key and the second temporary key, such that the first user equipment and the second user equipment are allowed to perform encryption and decryption operations of the device-to-device communication according to the device-to-device master key information.

21. The authentication system for device-to-device communication as claimed in claim 20, wherein the first user equipment generates the first random value and generates the first temporary key according to the master key of the device-to-device master key information, and transmits the first random value to the second user equipment;
   the second user equipment generates the second random value and calculates the second temporary key according to the master key of the device-to-device master key information;
   the second user equipment calculates a first intermediary value according to the second temporary key and the first random value, and transmits the first intermediary value and the second random value to the first user equipment;
   the first user equipment calculates a second intermediary value according to the first temporary key and the first random value, and determines whether the first intermediary value is the same to the second intermediary value;
   when the first intermediary value is the same to the second intermediary value, the first user equipment calculates a third intermediary value according to the first temporary key and the second random value, and transmits the third intermediary value to the second user equipment;
   the second user equipment calculates a fourth intermediary value according to the second temporary key and the second random value, and determines whether the third intermediary value is the same to the fourth intermediary value; and
   when the third intermediary value is the same to the fourth intermediary value, the second user equipment allows the first user equipment to perform encryption and decryption operations of the device-to-device communication according to the device-to-device master key information.

22. The authentication system for device-to-device communication as claimed in claim 18, wherein the mutual authentication is that when the first user equipment receives the device-to-device master key information and the second user equipment does not have the device-to-device master key information, the first user equipment generates the first random value, and transmits the first random value and the master key of the device-to-device master key information to the second user equipment; the second user equipment generates the second random value and transmits the second random value to the first user equipment, the first user equipment and the second user equipment perform the mutual authentication according to the master key of the device-to-device master key information, the first random value and the second random value, such that the first user equipment and the second user equipment are allowed to perform encryption and decryption operations of the device-to-device communication according to the device-to-device master key information.

23. The authentication system for device-to-device communication as claimed in claim 22, wherein the first user equipment generates the first random value and transmits the first random value and the master key of the device-to-device master key information to the second user equipment;
   the second user equipment generates the second random value and calculates a first intermediary value according to the first random value and the master key, and transmits the first intermediary value and the second random value to the first user equipment;
   the first user equipment calculates a second intermediary value according to the first random value and the master key, and determines whether the first intermediary value is the same to the second intermediary value;
   when the first intermediary value is the same to the second intermediary value, the first user equipment calculates a third intermediary value according to the second random value and the master key, and transmits the third intermediary value to the second user equipment;
   the second user equipment calculates a fourth intermediary value according to the second random key and the master key, and determines whether the third intermediary value is the same to the fourth intermediary value;

when the third intermediary value is the same to the fourth intermediary value, the second user equipment allows the first user equipment to perform encryption and decryption operations of the device-to-device communication according to the device-to-device master key information, the first user equipment generates a first temporary key according to the master key of the device-to-device master key information, and transmits the first random value to the second user equipment;

the second user equipment generates the second random value and calculates a second temporary key according to the master key of the device-to-device master key information;

the second user equipment calculates the first intermediary value according to the second temporary key and the first random value, and transmits the first intermediary value and the second random value to the first user equipment;

the first user equipment calculates a second intermediary value according to the first temporary key and the first random value, and determines whether the first intermediary value is the same to the second intermediary value;

when the first intermediary value is the same to the second intermediary value, the first user equipment calculates a third intermediary value according to the first temporary key and the second random value, and transmits the third intermediary value to the second user equipment;

the second user equipment calculates a fourth intermediary value according to the second temporary key and the second random value, and determines whether the third intermediary value is the same to the fourth intermediary value; and when the third intermediary value is the same to the fourth intermediary value, the second user equipment allows the first user equipment to perform encryption and decryption operations of the device-to-device communication according to the master key.

24. The authentication system for device-to-device communication as claimed in claim 15, wherein after the first user equipment obtains the device-to-device authentication, the first user equipment and the second user equipment send a device-to-device communication request to the device-to-device communication controller in the authentication server, the device-to-device communication controller receives the device-to-device communication request to generate device-to-device master key information, and transmits the device-to-device master key information to the first user equipment and the second user equipment to facilitate the first user equipment and the second user equipment to perform mutual authentication and device-to-device communication.

25. The authentication system for device-to-device communication as claimed in claim 24, wherein the mutual authentication is that the first user equipment generates the first random value and generates the first temporary key according to the master key of the device-to-device master key information, the second user equipment generates the second random value and calculates the second temporary key according to the master key of the device-to-device master key information, the first user equipment and the second user equipment transmit the first temporary key and the second temporary key to each other and perform the mutual authentication according to the master key of the device-to-device master key information, the first temporary key and the second temporary key, such that the first user equipment and the second user equipment are allowed to perform encryption and decryption operations of the device-to-device communication according to the device-to-device master key information.

26. The authentication system for device-to-device communication as claimed in claim 15, the first user equipment and the second user equipment perform the mutual authentication after obtaining the device-to-device master key information, the first user equipment generates a first random value and generates a first temporary key according to a master key of the device-to-device master key information, the second user equipment generates a second random value and calculates a second temporary key according to the master key of the device-to-device master key information, the first user equipment and the second user equipment transmit the first temporary key and the second temporary key to each other and perform the mutual authentication according to the master key of the device-to-device master key information, the first temporary key and the second temporary key, such that the first user equipment and the second user equipment are allowed to perform encryption and decryption operations of the device-to-device communication according to the device-to-device master key information.

27. The authentication system for device-to-device communication as claimed in claim 15, wherein during the device-to-device communication, the first user equipment and the second user equipment regenerate an encryption key and an integrity key required in the device-to-device communication according to a key index in the device-to-device master key information, and the first user equipment and the second user equipment adopt the regenerated encryption key and the integrity key to perform the device-to-device communication.

28. The authentication system for device-to-device communication as claimed in claim 15, wherein when the first user equipment and the second user equipment perform the device-to-device communication, the first user equipment executes a key updating event, and sends a key index updating request to the second user equipment, so as to increase the key index in the device-to-device master key information by a predetermined value, the first user equipment and the second user equipment regenerate the encryption key and the integrity key required in the device-to-device communication according to the increased key index in the device-to-device master key information, and the first user equipment and the second user equipment adopt the regenerated encryption key and the integrity key to perform the device-to-device communication.

29. An authentication method for device-to-device communication, adapted to first user equipment in a communication system, wherein the communication system further comprises an authentication server and second user equipment, the authentication method for device-to-device communication comprising:

sending a connection request to the authentication server;

performing a authentication procedure on the first user equipment by the authentication server and providing key generation information, and generating a server key by the authentication server according to the key generation information and a key derivation procedure; and generating an equipment key according to the key generation information and the key derivation procedure, so as to obtain device-to-device authentication, such that the first user equipment and the second user equipment obtaining the device-to-device authentication are able to directly perform the device-to-device communication without performing the device-to-device communication through the authentication server, wherein the authentication server comprises:
communication equipment, communicating with the first user equipment through a network protocol, and processing device-to-device communication within a communication range of the communication equipment; and
a processor configured to execute a management unit and an authentication unit, wherein after the management unit and the authentication unit receive the connection request sent by the first user equipment through the communication equipment, the authentication unit performs the authentication procedure on the first user equipment,
when the authentication procedure is successful, the authentication unit generates a first authentication key according to a result of the authentication procedure, and transmits the first authentication key to the management unit, the management unit respectively generates a first communication key and a first transmission key according to the first authentication key to serve as the server key, and the processor transmits the server key to the communication equipment.

30. The authentication method for device-to-device communication as claimed in claim 29, wherein after the first user equipment obtains the device-to-device authentication, the method further comprises:
providing a device-to-device communication request related to the second user equipment to a device-to-device communication controller in the authentication server; and
receiving the device-to-device master key information generated by the device-to-device communication controller from the device-to-device communication controller to facilitate the first user equipment and the second user equipment to perforin mutual authentication and communication according to the device-to-device master key information.

31. The authentication method for device-to-device communication as claimed in claim 29, wherein the step of performing the mutual authentication according to the device-to-device master key information comprises:
receiving a communication response determining whether to communicate with the first user equipment by the second user equipment from the device-to-device communication controller; and
determining whether to perform the mutual authentication between the first user equipment and the second user equipment according to the communication response.

32. The authentication method for device-to-device communication as claimed in claim 29, wherein the step of performing the mutual authentication between the first user equipment and the second user equipment comprises:
generating a first random value and generating a first temporary key according to a master key of the device-to-device master key information, and transmitting the first random value to the second user equipment;
receiving a second random value and a first intermediary value generated by the second user equipment, wherein the first intermediary value is calculated by the second user equipment according to a second temporary key and the first random value, and the second temporary key is calculated by the second user equipment according to the master key of the device-to-device master key information;
calculating a second intermediary value according to the first temporary key and the first random value, and determining whether the first intermediary value is the same to the second intermediary value;
calculating a third intermediary value according to the first temporary key and the second random value when the first intermediary value is the same to the second intermediary value, and transmitting the third intermediary value to the second user equipment; and
calculating a fourth intermediary value according to the second temporary key and the second random value by the second user equipment, and allowing the first user equipment to perform encryption and decryption operations of the device-to-device communication according to the device-to-device master key information by the second user equipment when the third intermediary value is the same to the fourth intermediary value.

33. The authentication method for device-to-device communication as claimed in claim 29, wherein the step of performing the mutual authentication according to the device-to-device master key information comprises:
generating a first random value, and transmitting the first random value and a master key of the device-to-device master key information to the second user equipment when the first user equipment receives the device-to-device master key information and the second user equipment does not have the device-to-device master key information;
receiving a second random value and a first intermediary value generated by the second user equipment, wherein the first intermediary value is calculated by the second user equipment according to a second temporary key and the first random value, and the second temporary key is calculated by the second user equipment according to the master key of the device-to-device master key information;
calculating a second intermediary value according to the first temporary key and the first random value, and determining whether the first intermediary value is the same to the second intermediary value;
calculating a third intermediary value according to the first temporary key and the second random value when the first intermediary value is the same to the second intermediary value, and transmitting the third intermediary value to the second user equipment; and
calculating a fourth intermediary value according to the second temporary key and the second random value by the second user equipment, and allowing the first user equipment to perform encryption and decryption operations of the device-to-device communication according to the device-to-device master key information by the second user equipment when the third intermediary value is the same to the fourth intermediary value.

34. An authentication method for device-to-device communication, adapted to an authentication server in a communication system, wherein the communication system further comprises first user equipment and second user equipment, the authentication method for device-to-device communication comprising:
receiving a connection request from the first user equipment;
performing an authentication procedure on the first user equipment and providing key generation information to the first user equipment;
generating a server key according to the key generation information and a key derivation procedure; and
generating an equipment key according to the key generation information and the key derivation procedure by the first user equipment, so as to obtain device-to-device authentication, such that the first user equipment and the second user equipment obtaining the device-to-device authentication are able to perform the device-to-device communication without performing the device-to-device communication through the authentication server,
wherein the authentication server comprises:
communication equipment, communicating with the first user equipment through a network protocol, and processing device-to-device communication within a communication range of the communication equipment; and
a processor configured to execute a management unit and an authentication unit, wherein after the management unit and the authentication unit receive the connection request sent by the first user equipment through the communication equipment, the authentication unit performs the authentication procedure on the first user equipment,
when the authentication procedure is successful, the authentication unit generates a first authentication key according to a result of the authentication procedure, and transmits the first authentication key to the management unit, the management unit respectively generates a first communication key and a first transmission key according to the first authentication key to serve as the server key, and the processor transmits the server key to the communication equipment.

35. An authentication system for device-to-device communication, comprising:
first user equipment; and
an authentication server, communicating with the first user equipment, comprises:
communication equipment, communicating with the first user equipment through a network protocol, and processing device-to-device communication within a communication range of the communication equipment; and
a processor configured to execute a management unit and an authentication unit, wherein after the management unit and the authentication unit receive a connection request sent by the first user equipment through the communication equipment, the authentication unit performs an authentication procedure on the first user equipment,
wherein when the authentication procedure is successful, the authentication unit generates a first authentication key according to a result of the authentication procedure, and transmits the first authentication key to the management unit, the management unit generates a first communication key according to the first authentication key and transmits the first communication key to the communication equipment, the communication equipment stores the first communication key and generates a first transmission key according to the first communication key, wherein the first communication key and the first transmission key are referred to as a server key,
wherein when the first user equipment sends the connection request to the authentication server, the authentication server performs the authentication procedure on the first user equipment and provides key generation information to the first user equipment,
the authentication server generates the server key according to the key generation information and a key derivation procedure, and
the first user equipment generates an equipment key according to the key generation information and the key derivation procedure, so as to obtain device-to-device authentication, such that the first user equipment and a second user equipment obtaining the device-to-device authentication are able to directly perform the device-to-device communication without performing the device-to-device communication through the authentication server.

36. An authentication system for device-to-device communication, comprising:
first user equipment and second user equipment; and
an authentication server, located within communication ranges of the first user equipment and the second user equipment, comprises:
communication equipment, communicating with the first user equipment through a network protocol, and processing device-to-device communication within a communication range of the communication equipment; and
the authentication server configured to execute a management unit and an authentication unit, wherein after the management unit and the authentication unit receive a connection request sent by the first user equipment through the communication equipment, the authentication unit performs an authentication procedure on the first user equipment,
wherein when the authentication procedure is successful, the authentication unit generates a first authentication key according to a result of the authentication procedure, and transmits the first authentication key to the management unit, the management unit generates a first communication key according to the first authentication key and transmits the first communication key to the communication equipment, the communication equipment stores the first communication key and generates a first transmission key according to the first communication key, wherein the first communication key and the first transmission key are referred to as a server key,
wherein when the first user equipment and the second user equipment respectively send the connection request for device-to-device communication to the authentication server, the authentication server performs authentication procedures on the first user equipment and the second user equipment, and respectively provides first key generation information and second key generation information to the first user equipment and the second user equipment,
the authentication server generates the server key according to the first key generation information, the second key generation information and a key derivation procedure, and
the authentication server respectively transmits the server key to the first user equipment and the second user equipment, such that the first user equipment and the second user equipment obtain device-to-device authentication and directly perform the device-to-device communication without performing the device-to-device communication through the authentication server.

37. An authentication method for device-to-device communication, adapted to first user equipment in a communication system, wherein the communication system further comprises an authentication server and second user equipment, the authentication method for device-to-device communication comprising:
sending a connection request to the authentication server;
performing a authentication procedure on the first user equipment by the authentication server and providing key generation information, and generating a server key by the authentication server according to the key generation information and a key derivation procedure; and generating an equipment key according to the key generation information and the key derivation procedure, so as to obtain device-to-device authentication, such that the first user equipment and the second user equipment obtaining the device-to-device authentication are able to directly perform the device-to-device communication without performing the device-to-device communication through the authentication server, wherein the authentication server comprises:

communication equipment, communicating with the first user equipment through a network protocol, and processing device-to-device communication within a communication range of the communication equipment; and a processor configured to execute a management unit and an authentication unit, wherein after the management unit and the authentication unit receive the connection request sent by the first user equipment through the communication equipment, the authentication unit performs the authentication procedure on the first user equipment, wherein when the authentication procedure is successful, the authentication unit generates a first authentication key according to a result of the authentication procedure, and transmits the first authentication key to the management unit, the management unit generates a first communication key according to the first authentication key and transmits the first communication key to the communication equipment, the communication equipment stores the first communication key and generates a first transmission key according to the first communication key, wherein the first communication key and the first transmission key are referred to as the server key.

38. An authentication method for device-to-device communication, adapted to an authentication server in a communication system, wherein the communication system further comprises first user equipment and second user equipment, the authentication method for device-to-device communication comprising:

receiving a connection request from the first user equipment;

performing an authentication procedure on the first user equipment and providing key generation information to the first user equipment;

generating a server key according to the key generation information and a key derivation procedure; and generating an equipment key according to the key generation information and the key derivation procedure by the first user equipment, so as to obtain device-to-device authentication, such that the first user equipment and the second user equipment obtaining the device-to-device authentication are able to perform the device-to-device communication without performing the device-to-device communication through the authentication server, wherein the authentication server comprises:

communication equipment, communicating with the first user equipment through a network protocol, and processing device-to-device communication within a communication range of the communication equipment; and a processor configured to execute a management unit and an authentication unit, wherein after the management unit and the authentication unit receive the connection request sent by the first user equipment through the communication equipment, the authentication unit performs the authentication procedure on the first user equipment, wherein when the authentication procedure is successful, the authentication unit generates a first authentication key according to a result of the authentication procedure, and transmits the first authentication key to the management unit, the management unit generates a first communication key according to the first authentication key and transmits the first communication key to the communication equipment, the communication equipment stores the first communication key and generates a first transmission key according to the first communication key, wherein the first communication key and the first transmission key are referred to as the server key.

* * * * *